(12) United States Patent
Li

(10) Patent No.: US 10,718,464 B2
(45) Date of Patent: Jul. 21, 2020

(54) TRIPOD HEAD

(71) Applicant: Shenzhen Youbaise Technology Co., Ltd., Shenzhen (CN)

(72) Inventor: Dinglan Li, Shenzhen (CN)

( * ) Notice: Subject to any disclaimer, the term of this patent is extended or adjusted under 35 U.S.C. 154(b) by 0 days.

(21) Appl. No.: 16/587,100

(22) Filed: Sep. 30, 2019

(65) Prior Publication Data
US 2020/0025330 A1   Jan. 23, 2020

(51) Int. Cl.
*F16M 11/04* (2006.01)
*F16M 11/14* (2006.01)

(52) U.S. Cl.
CPC .......... *F16M 11/14* (2013.01); *F16M 11/041* (2013.01); *F16M 2200/021* (2013.01)

(58) Field of Classification Search
CPC .. G03B 17/561; G03B 17/566; F16M 11/041; A45F 2200/0533
See application file for complete search history.

(56) References Cited

U.S. PATENT DOCUMENTS

| | | | | |
|---|---|---|---|---|
| 4,473,177 A * | 9/1984 | Parandes | ............ | G03B 17/566 224/191 |
| 8,333,353 B1 * | 12/2012 | Silverman | ............ | F16M 11/041 24/331 |
| 9,288,920 B1 * | 3/2016 | Steiner | ............ | F16M 11/38 |
| 9,416,914 B1 * | 8/2016 | Fan | ............ | F16M 11/105 |
| 9,420,712 B2 * | 8/2016 | Yang | ............ | F16M 11/041 |
| 9,989,190 B2 | 6/2018 | Torbitt | | |
| 10,222,794 B2 * | 3/2019 | Deng | ............ | F16M 11/10 |
| 10,365,543 B2 * | 7/2019 | O'Neill | ............ | G03B 17/563 |
| 10,386,012 B2 * | 8/2019 | Balmer | ............ | F16M 13/00 |
| 2003/0081953 A1 | 5/2003 | Wei | | |
| 2014/0097306 A1 * | 4/2014 | Hale | ............ | G03B 17/566 248/122.1 |
| 2014/0130334 A1 * | 5/2014 | Chun | ............ | F16M 11/041 29/525.01 |
| 2016/0091139 A1 * | 3/2016 | Levine | ............ | G03B 17/563 294/139 |
| 2017/0119135 A1 * | 5/2017 | Somoano | ............ | F16M 13/00 |
| 2018/0274715 A1 * | 9/2018 | Somoano | ............ | F16M 11/38 |
| 2018/0320813 A1 * | 11/2018 | Karman | ............ | F16C 11/106 |
| 2019/0003638 A1 * | 1/2019 | Bertelle | ............ | F16M 13/02 |
| 2019/0094853 A1 * | 3/2019 | Overall | ............ | F16M 11/10 |
| 2019/0368653 A1 * | 12/2019 | Olinger | ............ | G03B 17/561 |

* cited by examiner

*Primary Examiner* — Bradley Duckworth
(74) *Attorney, Agent, or Firm* — HYIP

(57) ABSTRACT

The present disclosure provides a tripod head. The tripod head comprises a support frame, a support plate connected with the support frame, a rotating plate having a first surface and a second surface, and a clamping plate connected with a second end of the rotating plate, wherein a first end of the rotating plate is rotationally connected with the support plate; and the clamping plate is located on the second surface and forms a clamping mechanism for clamping a first electronic device with the support plate when the rotating plate rotates corresponding to the support plate to form a certain angle. The clamping mechanism of the present disclosure can be folded so as to reduce the space.

13 Claims, 4 Drawing Sheets

TRIPOD HEAD

TECHNICAL FIELD

The present disclosure relates to tripod heads, and in particular to a tripod head for connecting electronic device.

BACKGROUND

A tripod head belongs to a support device and is used for mounting and fixing an electronic device having a photographing function such that the electronic device is supported and reaches a certain horizontal height to be conveniently used for photographing. However, a clamping mechanism of the existing tripod head, which is used for mounting the electronic device, cannot be folded.

SUMMARY

To ensure the validity of electric connection, the present disclosure provides a tripod head, wherein its clamping mechanism can be folded so as to reduce the space.

The present disclosure provides a tripod head, comprising:
a support frame;
a support plate, connected with the support frame;
a rotating plate, having a first surface and a second surface, wherein a first end of the rotating plate is rotationally connected with the support plate; and
a clamping plate, connected with a second end of the rotating plate, wherein the clamping plate is located on the second surface and forms a clamping mechanism for clamping a first electronic device with the support plate when the rotating plate rotates corresponding to the support plate to form a certain angle.

When the clamping mechanism is used for clamping an electronic device, the rotating plate can turn over correspondingly to the support plate such that a certain included angle, such as an angle of 90 degrees, is formed between the rotating plate and the support plate, and the electronic device can be placed between the clamping plate and the rotating plate and is fixedly clamped by the clamping plate and the rotating plate; and when the clamping mechanism does not need to clamp the electronic device, the rotating plate can be folded so as to reduce the space of the clamping mechanism.

DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure. It can be understood that the accompanying drawings are merely used for providing reference and description, but not limitations to the present disclosure. Connection relationships shown in the accompanying drawings are merely used for facilitating, clear description, but are not used to limit connection manners.

Figure 1:
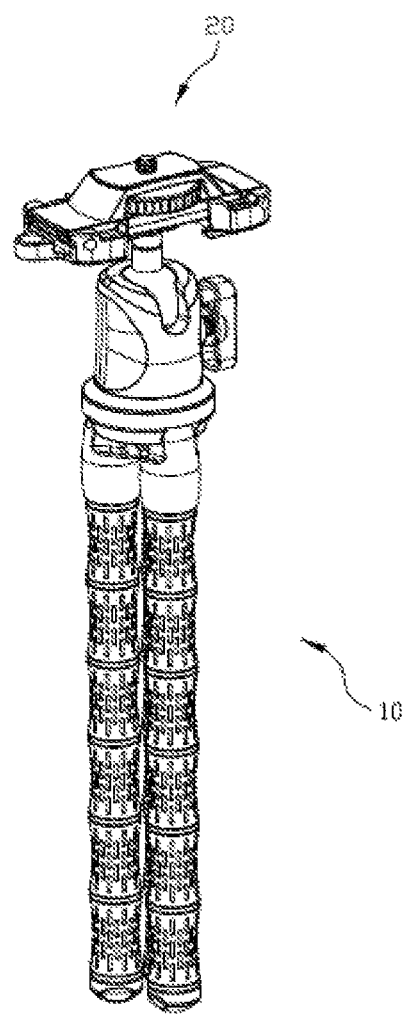
FIG. 1 is a schematic structural diagram of an embodiment of a tripod head 100 provided by the present disclosure.

FIG. 1 is a schematic structural diagram of an embodiment of a tripod head 100 provided by the present disclosure. In the embodiment, the tripod head 100 comprises a support frame 10 and a clamping mechanism 20, and the support frame 10 as a supporting part of the tripod head 100 and is used for being placed on positions, such as the ground and the like, such that the clamping mechanism 20 has a certain height, and an electronic device (which is a handheld terminal device having a photographing function, such as a mobile phone, a tablet computer and the like) fixed by the clamping mechanism 20 is suspended to achieve the photographing function.

Figure 2:
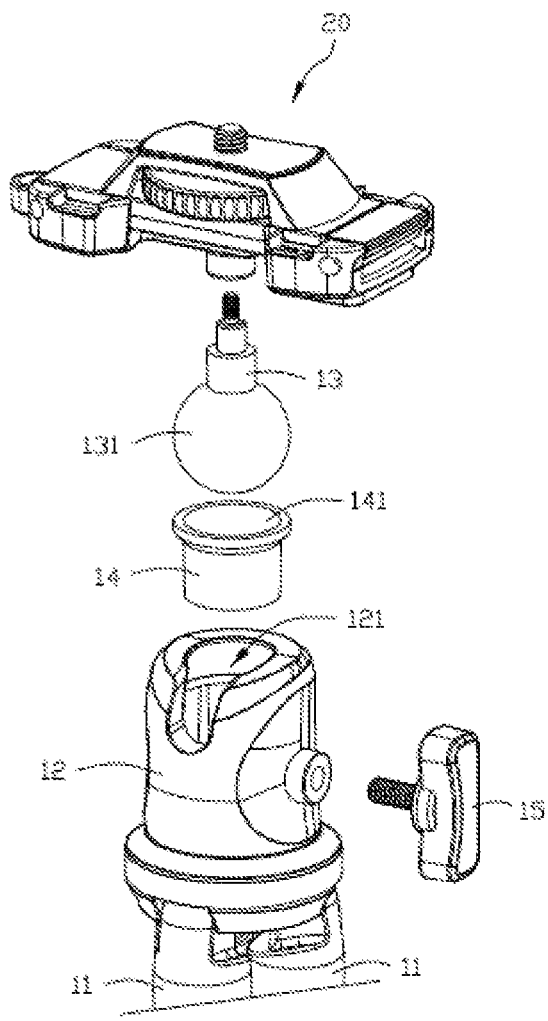
FIG. 2 is an exploded view of a support frame of an embodiment of the present disclosure.

In the embodiment, as shown in FIG. 2, the support frame 10 can comprise support legs 11, a head part 12, a connecting component 13, a seat body 14 and a locking component 15. The support frame 10 can comprise three support legs 11, and the support leg 11 is rotationally connected with the head part 12 such that an included angle between the support leg 11 and the horizontal plane can be adjusted to find out a stable angle or a supporting height of the clamping mechanism 20.

The connecting component 13 has a first connecting end and a second connecting end, wherein the first connecting end is used for connecting a subsequently mentioned support plate 21 while the second connecting end is provided with a ball head 131. The seat body 14 can be made from a deformation material, such as rubber and the like, such that deformation of the seat body 14 by external extrusion can be achieved, and the seat body 14 has a sunken spherical surface 141 matching with the ball head 131. An accommodating groove 121 is formed in the head part 12, and the seat body 14 is accommodated in the accommodating groove 121 and is fixed. The ball head 131 is accommodated in the accommodating groove 121 and is in contact with the sunken spherical surface 141. The locking component 15 may be a locking screw and is adjustably mounted at the head part 12 so as to be capable of extruding the seat body 14 to cause that the seat body 14 generates deformation to change a friction force between the ball head 131 and the sunken spherical surface 141 and then to change a rotational force required by rotation of the ball head 131 corresponding to the seat body 14, that is, an angle of the clamping mechanism 20 can be adjusted or fixed by matching of the ball head 131 and the accommodating groove 121.

The above manner can prevent abrasion of the ball head 131 caused by direct contact between the locking component 15 and the ball head 131 and can prevent that the angle of the clamping mechanism 20 cannot be fixed due to failure of friction between the locking component 15 and the ball head 131 in long-term use.

It can be understood that, in other embodiments, the ball head 131 can be arranged at the head part 12, the accommodating groove 121 and the locking component 15 can be arranged on the connecting component 13, the seat body 14 is arranged in the connecting component 13, and the same effect of the above embodiment can be achieved.

Figure 3:
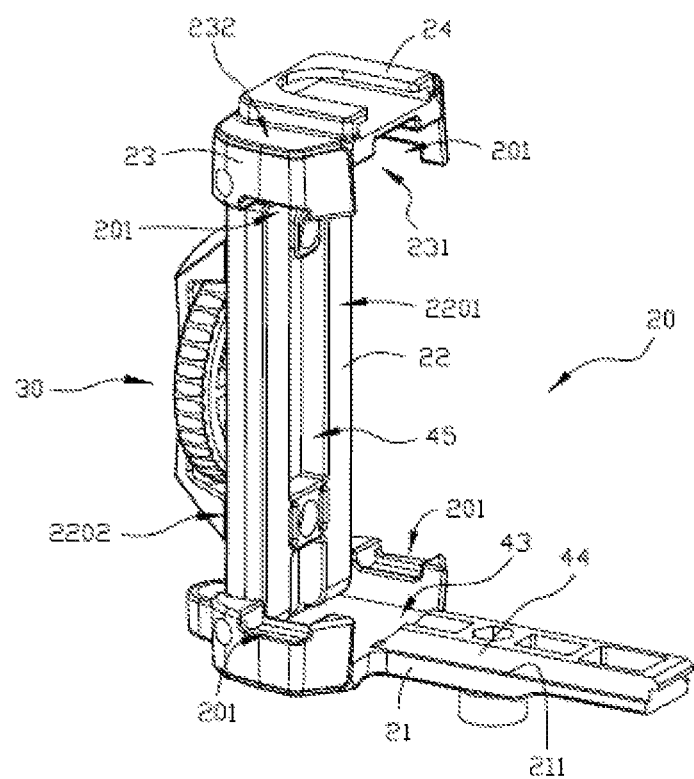
FIG. 3 is a schematic diagram of an unfolded clamping mechanism of an embodiment of the present disclosure.

As shown in FIG. 3, the clamping mechanism 20 can comprise the support plate 21, a rotating plate 22 and a clamping plate 23, the support plate 21 is fixed to the connecting component 13, a first end of the rotating plate 22 is rotatably connected with the support plate 21 through a rotating shaft, the clamping plate 23 has a clamping surface 231, and there may be a certain angle between the clamping surface 231 and the rotating plate 22, preferably, the angle is not greater than 90 degrees.

When the rotating plate 22 rotates to be unfolded corresponding to the support plate 21 to form a certain angle (such as an angle of 90 degrees), a clamping space is formed between the clamping plate 23 and the support plate 21 and is used for arranging a first electronic device, and the first electronic device is fixedly clamped between the clamping plate 23 and the support plate 21. As shown in FIG. 2, when the first electronic device does not need to be used, the rotating plate 22 can be folded corresponding to the support plate 21 (for example, the rotating plate can be folded to be in parallel and/or superposed with the support plate 21), so as to reduce a floor space of the clamping mechanism 20 and be convenient to carry or collect.

Preferably, a second end of the rotating plate 22 can be rotatably connected with the clamping plate 23 through another rotating shaft, so the clamping plate 23 can also be unfolded or folded to be collected corresponding to the rotating plate 22. when the first electronic device needs to be clamped, the clamping plate 23 is unfolded, and an included angle between the clamping plate and the rotating plate 22 can be adjusted to find out a proper clamping angle for the first electronic device; and when the first electronic device does not need to be clamped, the clamping plate 23 is folded.

Clamping slots 201 are formed in the support plate 21 and/or the clamping plate 23, edges of the first electronic device can be accommodated in the clamping slots 201 such that the first electronic device is limited and is prevented from departing from the support plate 21 and the clamping plate 23 to be further stabilized.

A cold shoe 24 is arranged on the clamping plate 23 so that an auxiliary photography device such as a fill lamp and the like can be mounted through the cold shoe 24. Especially, the cold shoe 24 is arranged at a back surface 232 opposite to the clamping surface 231 of the clamping plate 23, so, when the first electronic device is clamped, the auxiliary photography device can be just located on a side of the first electronic device so as to be convenient to assist the first electronic device in photographing.

Figure 4:
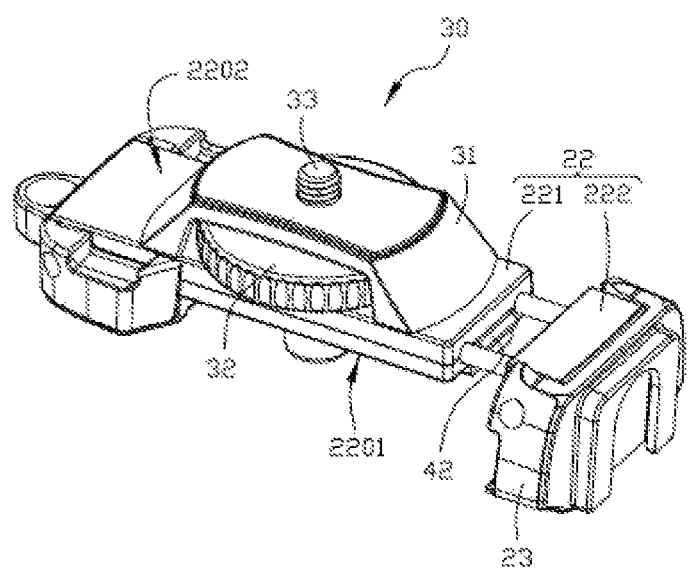
FIG. 4 is a schematic diagram of a folded clamping mechanism of an embodiment of the present disclosure in a first direction when a part of an adjusting component is pulled out.

In the embodiment, as shown in FIG. 3 and FIG. 4, the rotating plate 22 can comprise a body 221 and an adjusting component 222, wherein the clamping plate 23 is connected with the adjusting component 222, the adjusting component 222 can be in sliding connection with the body 221 through a structure such as slide bar and the like to change a distance between the adjusting component 222 and the body 221, so, a distance between the clamping plate 23 and the first end of the rotating plate 22 can be adjusted, and different sizes of first electronic devices can be clamped.

To provide a pretension force for maintaining the distance between the clamping plate 23 and the first end of the rotating plate 22 to be minimum, a spring can be arranged between the adjusting component 222 and the clamping plate 23, and due to the spring, the adjusting component 222 is pretensioned in a direction near the body 221 such that the first electronic device can be ensured to be stably clamped by the clamping mechanism 20.

Especially, the rotating plate 22 can comprise a first surface 2201 and a second surface 2202, the first surface 2201 and the second surface 2202 are opposite, and the first surface 2201 faces to a top surface 211 of the support plate 21. The clamping plate 23 is located on the first surface 2201, a mounting assembly 30 is arranged on the second surface 2202, and the mounting assembly 30 is used for mounting a second electronic device, wherein the second electronic device may be the same with or different from the first electronic device, for example, the first electronic device is preferably a thin electronic device such as a mobile phone and the like, and the second electronic device is preferably a large electronic device such as a camera and the like. Therefore, when the first electronic device is clamped, the second electronic device can be simultaneously mounted by the mounting assembly 30, or after the rotating plate 22 is folded and collected, the second electronic device is mounted independently by the mounting assembly 30.

In the present embodiment, the mounting assembly 30 comprises a panel 31, a quick-release screw 32 and a knob, the knob is limited between the panel 31 and the second surface 2202 and is connected with the quick-release screw 32, and the quick-release screw 32 can rotate by the knob such that the second electronic device is convenient to be connected.

The following continuously introduce the clamping mechanism 20. As shown in FIG. 3 and FIG. 4, the rotating plate 22 is provided with a first clamping portion 41, the support plate 21 is provided with a second clamping portion 42, and the first clamping portion 41 and the second clamping portion 42 correspond to each other and can be in clamping connection such that the rotating plate 22 is fixed into a whole body corresponding to the support plate 21, so, when the rotating plate 22 is folded, the rotating plate 22 is limited not to rotate, which is beneficial to stability of the second electronic device mounted on the rotating plate 22. The first clamping portion 41 may be a snap-fit assembly or a clamping slot, and correspondingly, the second clamping portion 42 may be the clamping slot or the snap-fit assembly.

Preferably, the first clamping portion 41 can be arranged on the body 221 and/or the adjusting component 222. when the first clamping portion 41 is arranged on the adjusting component 222, the first clamping portion 41 is in clamped connection with the second clamping portion 42 such that the adjusting component 222 is limited, and the first clamping portion 41 and the second clamping portion 42 can be disconnected by pulling the adjusting component 222 such that the rotating plate 22 can be unfolded.

After being folded, the rotating plate 22 can be supported by the support plate 21 so as to further improve the photographing stability of the second electronic device.

Especially, as shown in FIG. 2, a top surface of the support plate 21 is provided with a first limiting groove 43 and/or a first limiting block 44, the first limiting groove 43 matches with the rotating plate 22, the rotating plate 22 is provided with a second limiting groove 45 matching with the first limiting block 44, and when the rotating plate 22 can rotate to be in parallel with the support plate 21, a part of the rotating plate 22 can be located in the first limiting groove 43, and the first limiting block 44 is located in the second limiting groove 45, so, after the rotating plate 22 is folded, vibration of the rotating plate 22 corresponding to the support plate 21 can be further prevented, and the photographing stability of the second electronic device is further improved.

Figure 5:
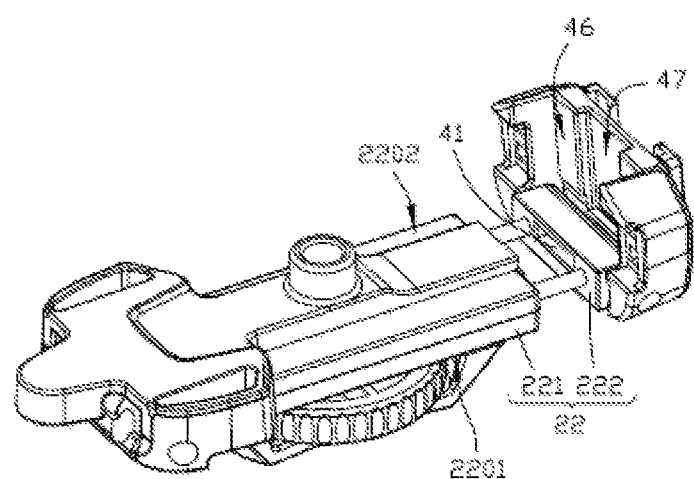
FIG. 5 is a schematic diagram of a folded clamping mechanism of an embodiment of the present disclosure in a second direction when a part of an adjusting component is pulled out.

Especially, as shown in FIG. 5, the clamping plate 23 is provided with a third limiting groove 46 matching with the rotating plate 22 and a fourth limiting groove 47 matching with the support plate 21, and when the rotating plate 22 rotates to be in parallel with the support plate 21 and the clamping plate 23 rotates towards the second surface 2202, a part of the rotating plate 22 can be located in the third limiting groove 46, and a part of the support plate 21 can be located in the fourth limiting groove 47, so, similarly, vibration of the rotating plate 22 corresponding to the support plate 21 can be further prevented, the photographing stability of the second electronic device is further improved, and the clamping plate 23 is convenient to be folded.

The above merely describes preferred embodiments of the present disclosure, but are not used to limit the present disclosure. Any modifications, equivalent replacements, improvements and the like within the spirit and principle of the present disclosure shall be all contained in the protection scope of the present disclosure.

What is claimed is:

1. A tripod head, comprising:
   a support frame;
   a support plate, connected with the support frame;
   a rotating plate, a first end of which is rotationally connected with the support plate; and
   a clamping plate, connected with a second end of the rotating plate, wherein the clamping plate and the support plate commonly for a clamping mechanism for clamping a first electronic device when the rotating plate rotates to a preset angle relative to the support plate,
   wherein a top surface of the support plate is provided with a first limiting groove and a first limiting block, the first limiting groove matches with the rotating plate, the rotating plate is provided with a second limiting groove matching with the first limiting block, and when the rotating plate rotates to be in parallel with the support plate, a part of the rotating plate can be located in the first limiting groove, and the first limiting block is located in the second limiting groove.

2. The tripod head according to claim 1, wherein the clamping plate is rotatably connected with the rotating plate.

3. The tripod head according to claim 2, wherein the rotating plate comprises a body and an adjusting component, the clamping plate is rotatably connected with the adjusting component, and a distance between the adjusting component and the body is adjustable so that a distance between the clamping plate and the first end of the rotating plate is adjusted.

4. The tripod head according to claim 3, wherein the adjusting component is provided with a first clamping portion, the support plate is provided with a second clamping portion, and when the distance between the adjusting component and the body is minimum, the adjusting component is fixed on the support plate due to clamping connection of the first clamping portion and the second clamping portion.

5. The tripod head according to claim 1, wherein clamping slots are formed in the support plate and/or the clamping plate, and edges of the first electronic device can be accommodated in the clamping slots when the first electronic device is clamped.

6. The tripod head according to claim 1, wherein the clamping plate is rotatably connected with the rotating plate.

7. The tripod head according to claim 6, wherein the clamping plate is provided with a third limiting groove matching with the rotating plate and a fourth limiting groove matching with the support plate, and when the rotating plate rotates to be in parallel with the support plate and the clamping plate rotates towards the rotating plate, a part of the rotating plate is located in the third limiting groove, and a part of the support plate is located in the fourth limiting groove.

8. The tripod head according to claim 1, wherein the rotating plate is provided with a first clamping portion, the support plate is provided with a second clamping portion, and due to the clamping connection between the first clamping portion and the second clamping portion, the rotating plate is fixed on the support plate.

9. The tripod head according to claim 1, wherein the tripod head further comprises a mounting assembly, the rotating plate has a first surface and a second surface opposite to the first surface, the clamping plate is located on the first surface, and the mounting assembly is arranged on the second surface and is used for mounting a second electronic device.

10. The tripod head according to claim 9, wherein the mounting assembly comprises a fast-release screw for connecting the second electronic device.

11. The tripod head according to claim 1, wherein the clamping plate is provided with a cold shoe.

12. The tripod head according to claim 11, wherein the clamping plate is provided with a back surface opposite to a clamping surface clamping the first electronic device, and the cold shoe is arranged on the back surface.

13. The tripod head according to claim 1, wherein the support frame comprises:
    support legs;
    a head part, connected with the support legs and having one of a ball head and an accommodating groove;
    a connecting component, having the other one of the ball head and the accommodating groove and fixed to the support plate; and
    a deformable seat body, arranged in the accommodating groove and provided with a sunken spherical surface matching with the ball head;
    wherein the ball head is arranged in the accommodating groove, and the seat body is pressed by a locking component to change a rotational force required by rotation of the ball head corresponding to the seat body.

* * * * *